No. 658,194. Patented Sept. 18, 1900.
C. TIFFANY.
PRUNING IMPLEMENT.
(Application filed Apr. 20, 1900.)
(No Model.)
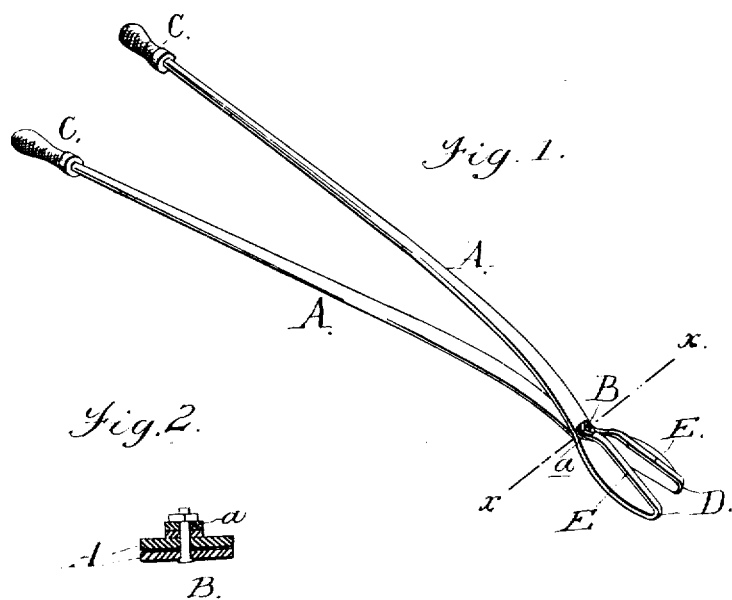
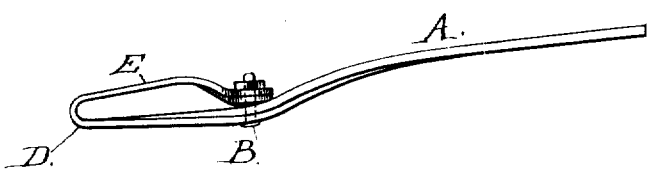
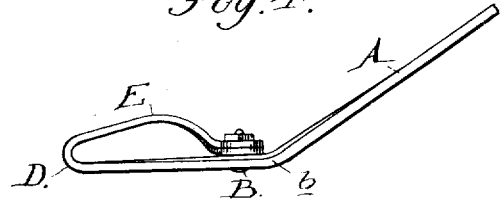
WITNESSES
Chapman W Fowler
Wm. T. Ballard
INVENTOR
Carroll Tiffany
by T. Walter Fowler
his Attorney

UNITED STATES PATENT OFFICE.

CARROLL TIFFANY, OF SCRANTON, PENNSYLVANIA.

PRUNING IMPLEMENT.

SPECIFICATION forming part of Letters Patent No. 658,194, dated September 18, 1900.

Application filed April 20, 1900. Serial No. 13,574. (No model.)

*To all whom it may concern:*

Be it known that I, CARROLL TIFFANY, a citizen of the United States, residing at Scranton, in the county of Lackawanna and State of Pennsylvania, have invented new and useful Improvements in Pruning Implements, of which the following is a specification.

This invention relates to that class of devices of the general type known as "pruning implements" and the special type thereof having means for engaging and holding the clipped cane, branch, twig, fruit, or other article after it has been severed.

This invention consists, essentially, of a pair of pivoted blades or cutters having integral extensions from their forward ends returned rearwardly, so as to lie above the blades or cutters, and having their extremities secured to the blades by the pivot-bolt of the latter.

It further consists of the parts and the constructions and combinations of parts which I shall hereinafter fully describe and claim.

The essential object of the invention is to devise an implement of the character mentioned which will facilitate the thinning out or removal of old canes, briers, suckers, &c., from blackberry-bushes, although it is not limited to this particular field, as the device is useful and efficient in cutting flowers or gathering fruits, &c.

In the accompanying drawings, which form a part of this specification, and in which similar letters of reference indicate corresponding parts, Figure 1 represents a perspective view of my improved pruning implement. Fig. 2 is an enlarged sectional view of the same on the line *x x* of Fig. 1. Fig. 3 is a side elevation. Fig. 4 is a modification to be referred to.

In the cultivation of the blackberry and kindred fruits the bushes or plants are worked each year and the old canes, briers, suckers, &c., are thinned out to promote the condition of the fruit-bearing bushes. The tool ordinarily used for this weeding-out process is a short-handled pair of shears, which is more or less unhandy and inefficient and compels the user to assume awkward and tiresome postures to get close to the part to be removed and to insert his hand into the bush and remove the severed portion, thereby often lacerating the hand by its contact with the briers.

The object of the present invention is to construct a light and efficient long-handled implement capable of convenient use and having means whereby the severed cane, brier, &c., can be removed without any danger of injury to the hand.

In carrying out the invention I construct the device of two blades A, pivoted together at their point of crossing by means of a bolt B, as in the manner of ordinary shears. Each blade is formed with a rearwardly-extending shank or handle having preferably a length of about two (2) feet, each of said shanks having a wooden or other knob, handle, or grip C. The forward ends or points of the blades are drawn outward to form substantially-narrow integral extensions D, which are bent backward over the blades and lie sufficiently removed therefrom to form companion jaws E, adapted to meet when the blades are closed and to grip and hold any article severed by said blades. The extremities of the extensions are formed with eyes or holes *a*, and these extremities overlap each other and receive the pivot-bolt which secures the blades together and forms the axis about which the blades move in opening and closing. Thus the jaws or holders and the blade constitute a unitary structure, and a single bolt or pivot unites the blades and also secures the free ends of the rigid jaws or holders. All other bolts, rivets, &c., are dispensed with, and all danger of the jaws working loose, as when they are formed of separate pieces bolted to the blades, as is commonly done in pruning implements, is entirely overcome and a stronger, more simple, and more effective implement is produced.

Owing to the length of the implement and the character of the work to which it is especially adapted I prefer to bend the device at about the point *b*, so that the blades and jaws shall stand at an angle to the handle portion and about at right angles to the article to be severed, Fig. 4, whereby the jaws grip the said article more firmly and securely. The jaws being rigid, in contradistinction to the spring or yielding jaws of the known art, grasp the cane or brier with sufficient firmness to enable me to entirely remove the severed part without the jaws loosening their hold on it, which is important in the pruning of tangled masses of bushes.

Having thus described my invention, what I claim as new, and desire to secure by Letters Patent, is—

1. In a pruning implement, the combination of pivotal blades each formed integral with front and rear extensions, one of said extensions serving as a handle and the other being bent back over the blade to form a gripping-jaw, said jaws having their free ends secured to the blades whereby the jaws are rigidly held.

2. A pruning implement including a pair of blades pivoted together said blades having integral rigid extensions from their points returned rearwardly over the blades and secured by the pivot-bolt of the latter.

3. A pruning implement consisting of blades pivoted together at their point of crossing said blades having rearwardly-extending shanks or handles and having their points drawn outward and returned over the blades to form rigid gripping or holding jaws for the severed article, and said jaws having their free ends formed with eyes or holes adapted to receive the pivot-bolt of the blades.

In testimony whereof I have hereunto set my hand in presence of two subscribing witnesses.

CARROLL TIFFANY.

Witnesses:
 FRANK DE WITT,
 ALLAN H. STONE.